United States Patent Office 3,073,835
Patented Jan. 15, 1963

3,073,835
1-ACYL-α,α-DIPHENYL-4-PIPERIDINEMETHANOLS
Kurt J. Rorig, Glenview, Ill., assignor to G. D. Searle & Co., Chicago, Ill., a corporation of Delaware
No Drawing. Filed July 13, 1961, Ser. No. 123,671
8 Claims. (Cl. 260—294.7)

This invention relates to 1-acyl-α,α-diphenyl-4-piperidinemethanols and a process for the manufacture thereof. More particularly, this invention relates to compounds of the formula

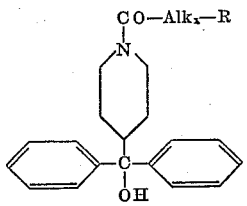

wherein Alk represents an alkylene or alkenylene radical, $x$ represents 0 or the positive integer 1, and R represents a phenyl radical optionally substituted by one or more alkyl and/or alkoxy radicals.

Among the alkylene and alkenylene radicals represented by Alk, especially lower alkylene and alkenylene radicals are preferred, for example, methylene, ethylene, vinylene, propylene, propenylene, trimethylene, methylpropenylene, methylbutenylene, tetramethylene, pentenylene, hexamethylene, etc., such of these groupings as contain fewer than 4 carbon atoms—viz., groupings of the formulas $$-C_mH_{2m}- \text{ and } -C_nH_{2n-2}-$$

wherein $m$ represents a positive integer less than 4 and $n$ represents a positive integer greater than 1 and less than 4—being perhaps optimally adapted to the purposes set forth. Certain of the compounds of this invention contain no alkylene or alkenylene radicals (when $x$ in the formula of paragraph 1 is 0), in which case the constituent, R, attaches directly to the indicated carbonyl.

Of the variously-substituted phenyl radicals embraced by R in the generic formula above, those comprising alkyl or alkoxy radicals of lower order, are especially advantageous. By alkyl and alkoxy radicals of lower order will be readily understood methyl, ethyl, propyl, isopropyl, butyl, isobutyl, sec-butyl, tert-butyl, pentyl, isopentyl, tert-pentyl, neopentyl, hexyl, isohexyl, heptyl, etc., and corresponding oxyalkyl groupings, each characterized by fewer than 8 carbon atoms. Most desirably, though not exclusively, no more than 1 lower alkyl or 3 lower alkoxy groupings is present on the phenyl nucleus, from which it follows that optimal embodiments or R can be enformulated thus

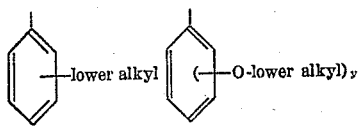

$y$ representing either 0 or a positive less than 4.

Compounds to which this invention relates are useful because of their valuable pharmacological properties. Most importantly, they are central nervous system depressants characterized by highly desirable tranquilizing effects in the animal body.

Manufacture of the subject compositions proceeds by heating α,α-diphenyl-4-piperidinemethanol with an acid chloride of the formula $$\text{Cl—CO—Alk}_x\text{—R}$$

(Alk, $x$, and R being defined as before) in an inert solvent such as acetone, butanone, chloroform, benzene, xylene, or the like, an acid acceptor such as potassium carbonate, pyridine, or triethylamine (i.e., an alkali carbonate or tertiary amine) being present if desired.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

α,α - Diphenyl - 1 - (3 - phenylpropionyl) - 4 - piperidinemethanol.—A mixture of 13 parts of α,α-diphenyl-4-piperidinemethanol, 9 parts of 3-phenylpropionyl chloride, 20 parts of pyridine, and 150 parts of chloroform is heated at the boiling point under reflux for 8 hours. The chloroform and pyridine are then removed by vacuum distillation, and the residual oil is partitioned between 100 parts of aqueous 5% potassium carbonate and 1000 parts of benzene. The benzene phase is separated and stripped of solvent by vacuum distillation, leaving α,α-diphenyl-1-(3-phenylpropionyl)-4-piperidinemethanol as the residue. Recrystallized from 70% ethanol, it melts at approximately 124–125° and has the formula

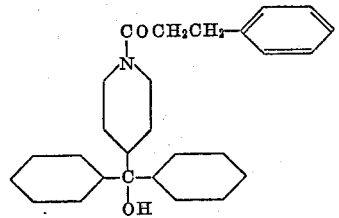

EXAMPLE 2

α,α-Diphenyl - 1 - (4 - phenylbutyryl) - 4 - piperidinemethanol.—A mixture of 52 parts of α,α-diphenyl-4-piperidinemethanol, 39 parts of 4-phenylbutyryl chloride, 80 parts of pyridine and 600 parts of chloroform is heated at the boiling point under reflux for 8 hours. The chloroform and pyridine are then removed by vacuum distillation and the residual oil is partitioned between aqueous 5% potassium carbonate and benzene. The benzene phase is separated and stripped of solvent by vacuum distillation, leaving as the residue the desired α,α-diphenyl-1-(4-phenylbutyryl)-4-piperidinemethanol. The product has the formula

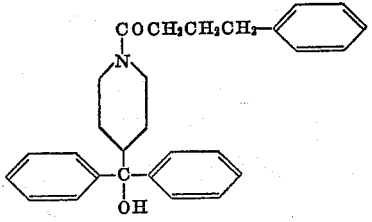

EXAMPLE 3

(A) p-Tert-butylcinnamic acid.—A mixture of 627 parts of p-tert-butylbenzaldehyde, 805 parts of malonic acid, and 40 parts of piperidine in 1500 parts of dry pyridine is heated with agitation at 80–90° for 1½ hours, during which time the malonic acid dissolves. The resultant solution is heated at the boiling point under reflux for ½ hour, then cooled and poured portion-wise with agitation into a mixture of 3570 parts of concentrated hydrochloric acid and 4500 parts of ice. Precipitation of p-tert-butylcinnamic acid occurs. The product is recovered by filtration, washed with water, and dissolved in 4640 parts of aqueous 14% potassium carbonate. This solution is washed with ether and then made acid with concentrated hydrochloric acid, re-precipitating purified p-tert-butylcinnamic acid. The product, isolated by filtration and recrystallized from butanone, melts at 201–204°.

(B) *p-Tert-butylcinnamoyl chloride.*—A mixture of 102 parts of p-tert-butylcinnamic acid, 200 parts of thionyl chloride, and 1 part of pyridine is heated to the boiling point under reflux over a period of 1 hour. The mixture is then distilled, excess thionyl chloride coming over first, followed at 119–125°/0.1 mm. by the desired p-tert-butylcinnamoyl chloride.

(C) *1 - (p - tert - butylcinnamoyl) - α,α - diphenyl - 4 - piperidinemethanol.*—A mixture of 111 parts of p-tert-butylcinnamoyl chloride, 134 parts of α,α-diphenyl-4-piperidinemethanol, and 35 parts of finely-powdered anhydrous potassium carbonate in 2000 parts of butanone is heated at the boiling point under reflux with agitation for 35 hours. The mixture is then stripped of solvent by vacuum distillation, and the residue is partitioned between 5000 parts of water and 1000 parts of benzene. The benzene phase is separated and stripped of solvent by vacuum distillation, leaving 1-(p-tert-butylcinnamoyl)-α,α-diphenyl-4-piperidinemethanol as the residue which, recrystallized from ethanol, melts at 218–220°. The product has the formula

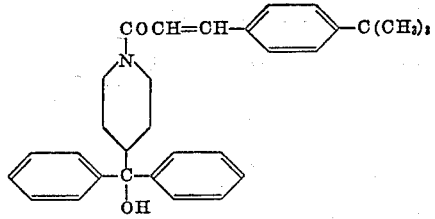

EXAMPLE 4

*1 - [4 - (p-tolyl) - 3 - butenoyl] - α,α - diphenyl - 4 - piperidinemethanol.*—Using the technique of Example 1, but substituting 12 parts of 4-(p-tolyl)-3-butenoyl chloride (made from 4-(p-tolyl)-3-butenoic acid, thionyl chloride, and pyridine according to the technique of Example 3B) for the 9 parts of 3-phenylpropionyl chloride called for therein, one obtains 1-[4-p-tolyl)-3-butenoyl]-α,α-diphenyl-4-piperidinemethanol, of the formula

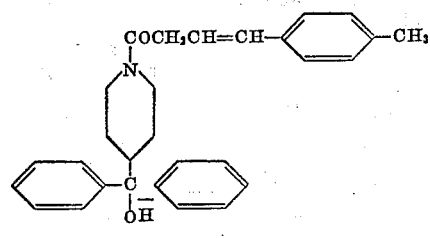

EXAMPLE 5

*1-(3,4,5 - trimethoxybenzoyl) - α,α - diphenyl-4-piperidinemethanol.*—Using the technique of Example 1, but substituting 12 parts of 3,4,5-trimethoxybenzoyl chloride for the 9 parts of 3-phenylpropionyl chloride called for therein, one obtains 1-(3,4,5-trimethoxybenzoyl)-α,α-diphenyl-4-piperidinemethanol which, recrystallized from ethanol, melts at 172–174°. The product has the formula:

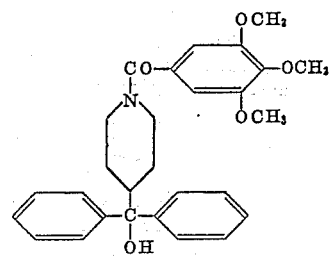

EXAMPLE 6

*1 - (3,4 - dimethoxyphenylacetyl)-α,α-diphenyl-4-piperidinemethanol.*—Using the technique of Example 1, but substituting 12 parts of 3,4-dimethoxyphenylacetyl chloride (made from 3,4-dimethoxyphenylacetic acid, thionyl chloride, and pyridine according to the technique of Example 3B) for the 9 parts of 3-phenylpropionyl chloride called for therein, one obtains 1-(3,4-dimethoxyphenylacetyl)-α,α-diphenyl-4-piperidinemethanol as a golden "glass." Characteristic infrared absorption maxima at 2.76, 6.12, 7.9, and 9.7μ confirm the identity of the product. It has the formula

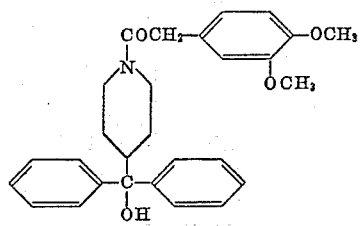

EXAMPLE 7

*1 - [3 - (m - ethoxyphenyl)propionyl]-α,α-diphenyl-4-piperidinemethanol.*—Using the technique of Example 1, but substituting 12 parts of 3-(m-ethoxyphenyl)propionyl chloride (made from 3-(m-ethoxyphenyl)propionic acid, thionyl chloride, and pyridine according to the technique of Example 3B) for the 9 parts of 3-phenyl-propionyl chloride called for therein, one obtains 1-[3-(m-ethoxyphenyl)propionyl] - α,α - diphenyl-4-piperidinemethanol. The product has the formula

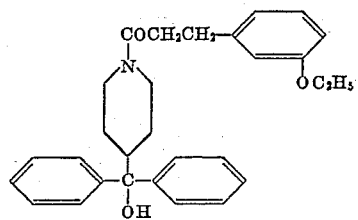

What is claimed is:
1. A compound of the formula

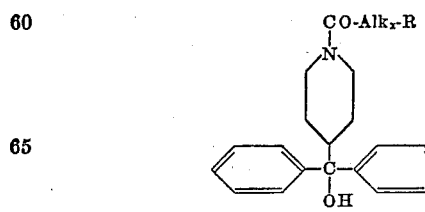

wherein Alk represents a member of the group consisting of alkylene and alkenylene radicals of the formulas $$-C_mH_{2m}- \text{ and } -C_nH_{2n-2}-$$

in which $m$ represents a positive integer less than 4 and $n$ represents a positive integer greater than 1 and less than 4, $x$ represents a member of the group consisting of 0 and the positive integer 1, and R represents a member of the group consisting of radicals of the formulas

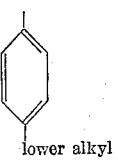
lower alkyl and

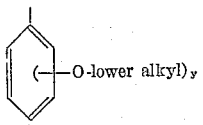

in which y represents a member of the group consisting of 0 and positive integers less than 4.

2. A compound of the formula

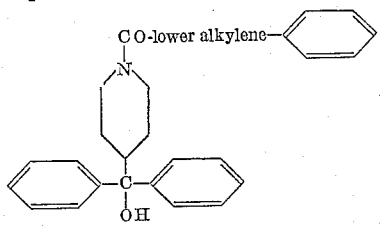

in which the lower alkylene radical contains fewer than 4 carbon atoms.

3. α,α - Diphenyl - 1(3 - phenylpropionyl) -4-diperidine-methanol.

4. A compound of the formula

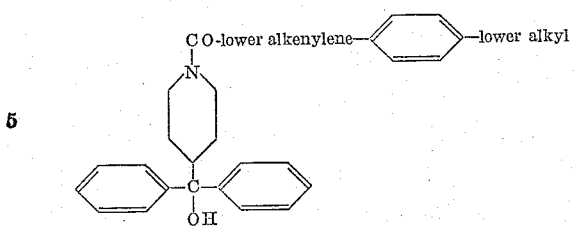

in which the lower alkenylene radical contains fewer than 4 carbon atoms.

5. 1-(p-tert-butylcinnamoyl)-α,α-diphenyl-4-piperidine-methanol.

6. A compound of the formula

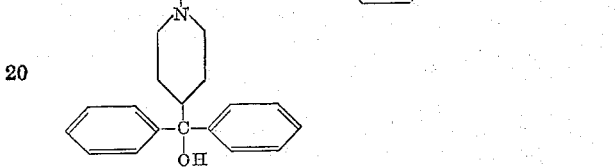

in which the lower alkylene radical contains fewer than 3 carbon atoms and z represents a positive integer less than 3.

7. 1(3,4-dimethoxyphenylacetyl)-α,α-diphenyl-4-piperi-dinemethanol.

8. 1 - (3,4,5 - trimethoxybenzoyl)-α,α-diphenyl-4-piperi-dinemethanol.

No references cited.

UNITED STATES PATENT OFFICE
CERTIFICATE OF CORRECTION

Patent No. 3,073,835                           January 15, 1963

Kurt J. Rorig

It is hereby certified that error appears in the above numbered patent requiring correction and that the said Letters Patent should read as corrected below.

Column 1, line 53, for "or" read -- of --; column 3, line 53, for "1-[4-p-tolyl)-" read -- 1-[4-(p-tolyl)- --; same column 3, lines 57 to 65, the formula should appear as shown below instead of as in the patent:

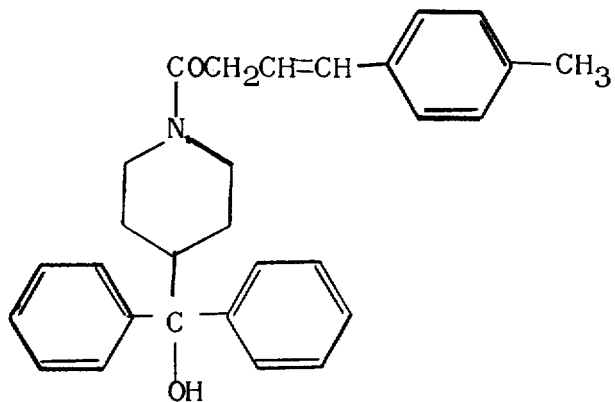

column 4, lines 1 and 2, for "formula:" read -- formula --; line 43, for "3-phenyl-propionyl" read -- 3-phenylpropionyl --; column 5, line 31, for "-1(3-phenylpropionyl)-4-diperidine-" read -- -1-(3-phenylpropionyl)-4-piperidine --; column 6, line 28, for "1(3,4-" read -- 1-(3,4- --.

Signed and sealed this 7th day of January 1964.

(SEAL)
Attest:
ERNEST W. SWIDER

Attesting Officer

EDWIN L. REYNOLDS

Acting Commissioner
of Patents